(12) United States Patent
Miyamoto (10) Patent No.: US 7,330,476 B2
(45) Date of Patent: Feb. 12, 2008

(54) QUEUE ALLOCATION SYSTEM AND QUEUE ALLOCATION METHOD OF A PACKET EXCHANGER

(75) Inventor: Rei Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 890 days.

(21) Appl. No.: 10/097,383

(22) Filed: Mar. 15, 2002

(65) Prior Publication Data

US 2002/0136228 A1  Sep. 26, 2002

(30) Foreign Application Priority Data

Mar. 21, 2001  (JP)  ............... 2001-080158

(51) Int. Cl.
  *H04L 12/28* (2006.01)
(52) U.S. Cl. ............... 370/412; 370/328; 710/56
(58) Field of Classification Search ............... 370/230, 370/230.1, 229–235, 395.41, 395.42, 412, 370/477
See application file for complete search history.

(56) References Cited

U.S. PATENT DOCUMENTS

| | | | |
|---|---|---|---|
| 5,313,454 A | | 5/1994 | Bustini et al. |
| 5,797,042 A | * | 8/1998 | Gaylord ............... 710/56 |
| 6,034,945 A | * | 3/2000 | Hughes et al. ............... 370/230 |
| 6,105,070 A | * | 8/2000 | Gaylord ............... 709/232 |
| 6,219,728 B1 | * | 4/2001 | Yin ............... 710/52 |
| 6,728,253 B1 | * | 4/2004 | Jeffries et al. ............... 370/412 |
| 6,788,697 B1 | * | 9/2004 | Aweya et al. ............... 370/412 |
| 6,947,450 B2 | * | 9/2005 | Mangin ............... 370/537 |
| 6,967,921 B1 | * | 11/2005 | Levy et al. ............... 370/230.1 |
| 6,970,424 B2 | * | 11/2005 | Fawaz et al. ............... 370/232 |
| 2002/0136228 A1 | | 9/2002 | Miyamoto |

FOREIGN PATENT DOCUMENTS

| | | |
|---|---|---|
| GB | 2 347 833 A | 9/2000 |
| JP | 5-316148 | 11/1993 |
| JP | 8-191306 | 7/1996 |
| JP | 11-32050 | 2/1999 |
| JP | 2002-94605 | 3/2002 |
| WO | WO 00/41368 | 7/2000 |

OTHER PUBLICATIONS

Japanese Office Action dated May 25, 2004 with English translations of pertinent portions.
European Search Report dated Oct. 17, 2002.

* cited by examiner

*Primary Examiner*—Bob A. Phunkulh
(74) *Attorney, Agent, or Firm*—Whitham Curtis Christofferson & Cook, PC (57) ABSTRACT

A queue sort selection part 1 uses as a search key a sort tag included in an inputted packet to decide a queue to be allocated to the packet. A utilization computation part 7 computes utilization of each queue by computing the packet storage number of the each queue. An allocation coordinating part 8 computes a new allocating result in which the inputted packets are divided and allocated among all queues. An information setting storage part 2 holds information used for allowing the queue sort selection part 1 to decide a queue to be allocated to the inputted packet. The packet stored into the queue held in a holding storage part 4 is transmitted in the stored time order. This can prevent deterioration of transmission quality such as a delay characteristic, packet loss percentage and a jitter characteristic due to packet concentration onto one queue and realize enhancement of the resource utilization of all queues and finer priority control.

9 Claims, 6 Drawing Sheets

| NUMBER | SORT TAG CONTENTS | QUEUE ID |
|---|---|---|
| 1 | | |
| 2 | | |
| ----- | | |
| N | | |

| NUMBER | SORT TAG CONTENTS | QUEUE ID | SEARCH CORRESPONDENCE NUMBER |
|---|---|---|---|
| 1 | | | |
| 2 | | | |
| ----- | | | |
| N | | | |

Fig.11

QUEUE ALLOCATION SYSTEM AND QUEUE ALLOCATION METHOD OF A PACKET EXCHANGER

BACKGROUND OF THE INVENTION

1. Field of the Invention

The present invention relates to a queue allocation system and a queue allocation method of a packet exchanger. In particular, the present invention relates to a queue allocation system and a queue allocation method of a packet exchanger which can reduce transmission quality deterioration due to packet concentration onto one queue.

2. Description of Related Art

A prior art queue allocation system and queue allocation method of a packet exchanger each have a plurality of queues which realize priority control of a plurality of priorities; part for extracting information for judging the priority of an inputted packet; and part for deciding a queue to be allocated to the packet based on the extracted information.

The prior art has no part for feeding back the allocated queue utilization to re-compute occasional optimal queue allocation. When packets having a similar priority are inputted to a packet exchanger, the packets are concentratively stored into a specified queue, resulting in deterioration of transmission quality such as a delay characteristic, packet loss percentage and a jitter characteristic. In addition, priority control using a plurality of queues cannot be performed.

SUMMARY OF THE INVENTION

An object of the present invention is to provide a queue allocation system and a queue allocation method of a packet exchanger which can prevent transmission quality from being deteriorated even when inputted packets are concentrated onto one queue, and realize enhancement of the resource utilization of all queues and finer priority control.

A queue allocation system according to the present invention has a queue sort selection part for using as a search key a sort tag included in an inputted packet to decide a queue to be allocated to the packet; a utilization computation part for computing utilization of each queue by computing the packet storage number of the each queue; an allocation coordinating part for computing a new allocating result in order to divide and allocate the inputted packets among all queues using information of the utilization computation part; information setting storage part for holding information for allowing the queue sort selection part to decide a queue to be allocated to the inputted packet; and holding storage part for holding predetermined N pieces of queues, wherein the packet is transmitted in the order in which it is stored into the queue held in the holding storage part.

A queue allocation method of a packet exchanger according to the present invention has a queue sort selection step for using as a search key a sort tag included in an inputted packet to decide a queue to be allocated to the packet; a utilization computation step for computing utilization of each queue by computing the packet storage number of the each queue; an allocation coordinating step for computing a new allocating result in order to divide and allocate the inputted packets among all queues using information of the utilization computation step; information setting storage step for holding information for allowing the queue sort selection step to decide a queue to be allocated to the inputted packet; and holding storage step for holding predetermined N pieces of queues, wherein the packet is transmitted in the order in which it is stored into the queue held in the holding storage step.

BRIEF DESCRIPTION OF THE DRAWINGS

The above and other objects, features and advantages of the present invention will become more apparent from the following detailed description when taken in conjunction with the accompanying drawing wherein.

DETAILED DESCRIPTION OF THE PREFERRED EMBODIMENTS

Embodiments of a queue allocation system and a queue allocation method of a packet exchanger according to the present invention will be described using FIGS. 1 to 11.

Figure 1:
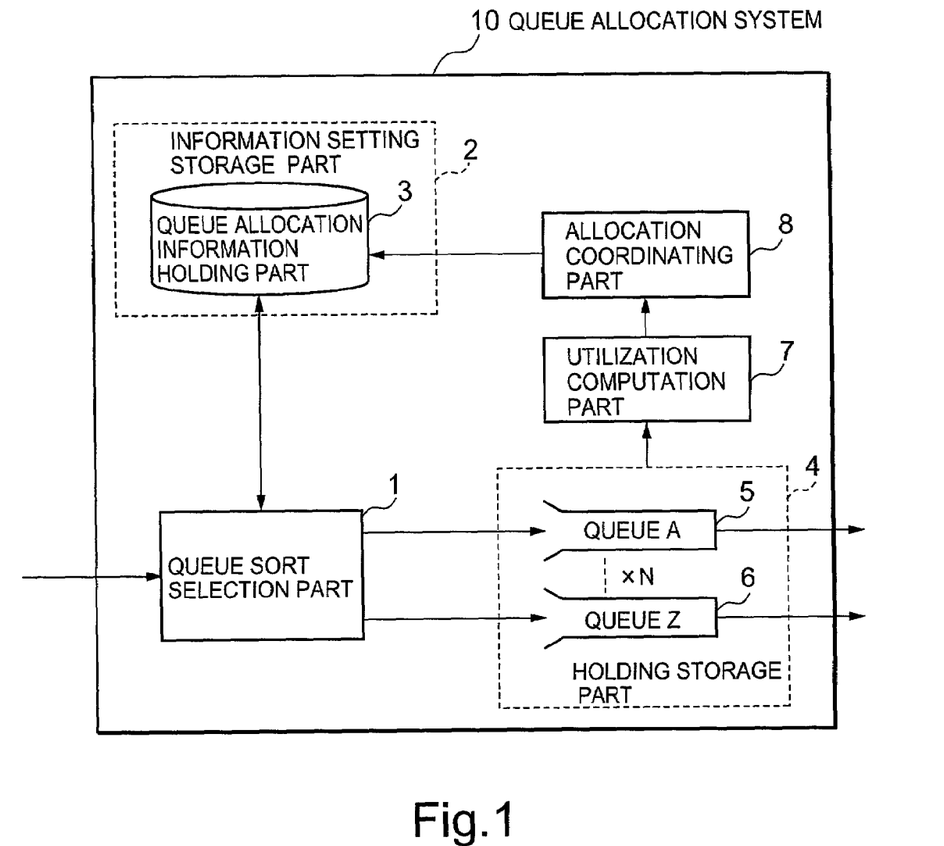
FIG. 1 is a block diagram showing the configuration of a queue allocation system according to a first embodiment of the present invention.

FIG. 1 is a block diagram showing the configuration of a queue allocation system of a packet exchanger according to a first embodiment of the present invention. In FIG. 1, a queue allocation system 10 has a queue sort selection part 1, an information setting storage part 2 having a queue allocation information holding part 3, holding storage part 4 for holding queues A5 to Z6, a utilization computation part 7, and an allocation coordinating part 8.

In FIG. 1, the queue sort selection part 1 uses as a search key a sort tag included in a packet inputted to the queue allocation system 10 to search the contents of the queue allocation information holding part 3 realized in the information setting storage part 2, thereby deciding a queue to be allocated to the packet. The queue sort selection part 1 determines a queue to be allocated to the packet from N pieces of queues A5 to Z6 realized in the holding storage part 4 and adds the packet to the queue. As the sort tag, for example, traffic class information in the header of an IPv6 packet can be used.

The packet inputted to the queue is stored into any one of N pieces of queues A5 to Z6 realized in the holding storage part 4 by the queue sort selection part 1 based on the deciding result. The N pieces of queues A5 to Z6 are a FIFO type queue, and the packet is transmitted in the order in which it is stored into the queue.

The utilization computation part 7 computes utilization of each queue by computing the packet storage number of the each queue. The packet storage number may be regularly computed at certain time intervals. Alternatively, the packet storage number may be irregularly computed by a command from a service person in charge of a packet exchanger.

The allocation coordinating part 8 obtains from information of the utilization computation part 7 a graph in which the identification number of a queue is indicated by the X axis and utilization of the queue is indicated by the Y axis so as to flatten the queue utilization targeting all ranges of the X axis. This computes a new allocating result in which the inputted packets are divided and allocated among all queues. At the same time, based on the allocating result, the contents of the queue allocation information holding part 3 are corrected.

In such a manner, this embodiment performs feedback control which uses the flattening method of queue utilizations to divide and allocate the inputted packets among all queues. For this reason, even when packet storage is concentrated onto one queue due to packets having a similar priority, deterioration of transmission quality such as a delay characteristic, packet loss percentage and a jitter characteristic due to packet concentration onto one queue can be prevented, and enhancement of the resource utilization of all queues and finer priority control can be realized.

Figure 2:
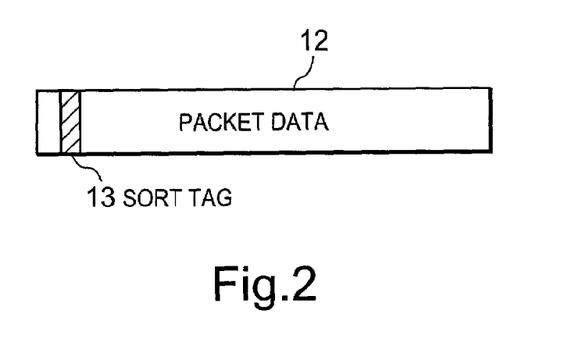
FIG. 2 is a diagram showing the structure of a packet.

FIG. 2 shows a structure example of a packet inputted to the queue allocation system 10. In this example, the packet has packet data 12. A sort tag 13 shows information of a given width in any previously set position of the packet data 12 and describes information showing a priority inherent to the packet here.

Figure 3:
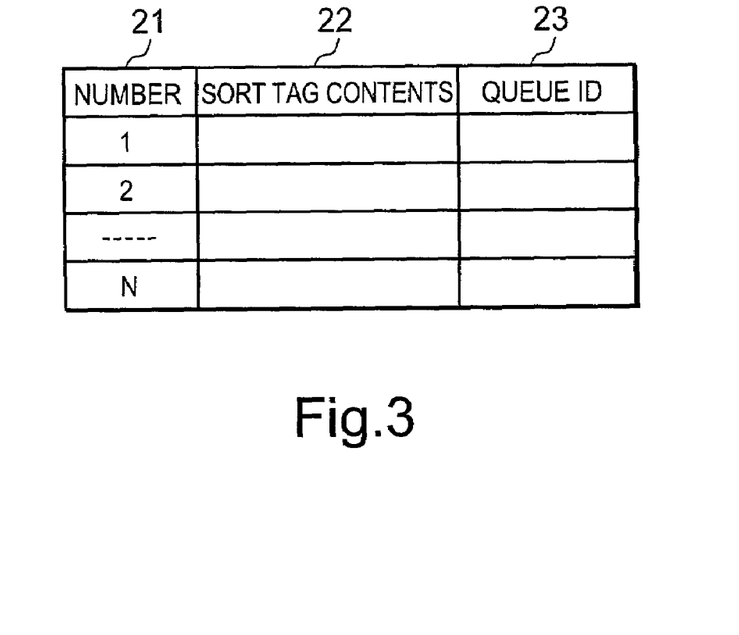
FIG. 3 is a diagram showing the structure of stored data in a queue allocation information holding part of FIG. 1.

FIG. 3 shows the structure of stored data in the queue allocation information holding part 3 of FIG. 1. The numeral 21 specifies a line number of a table configuring the queue allocation information holding part. The numeral 21 is a unique numerical value and has consecutive integer values from 1 to N in a table having N lines of entries. To sort tag contents 22, information showing a priority as the contents of the sort tag 13 included in the packet inputted is inputted.

A queue ID 23 is an identification number to specify a specified queue. When there exist N pieces of queues, consecutive integer values from 1 to N are allocated to each queue. This value is stored as an identification number into the queue ID 23. In the first embodiment shown in FIG. 1, ID information to specify any one of N pieces of queues A5 to Z6 is stored.

The contents of the queue allocation information holding part 3 are sorted in the order of descending priorities. When the sort tag and queue allocation are corrected, the correction can be facilitated without interchanging the relative priority orders between queues.

The configuration of this embodiment is described above in detail. The part for realizing N pieces of queues A5 to Z6 and the part for computing queue utilization of FIG. 1 are well known to those skilled in the art and are not directly related to the present invention. The detailed configuration thereof is omitted.

An operation example of the queue allocation system 10 according to this embodiment will be described. A process operation of the queue sort selection part 1 shown in FIG. 1 will be described using a flowchart shown in FIG. 4.

Figure 4:
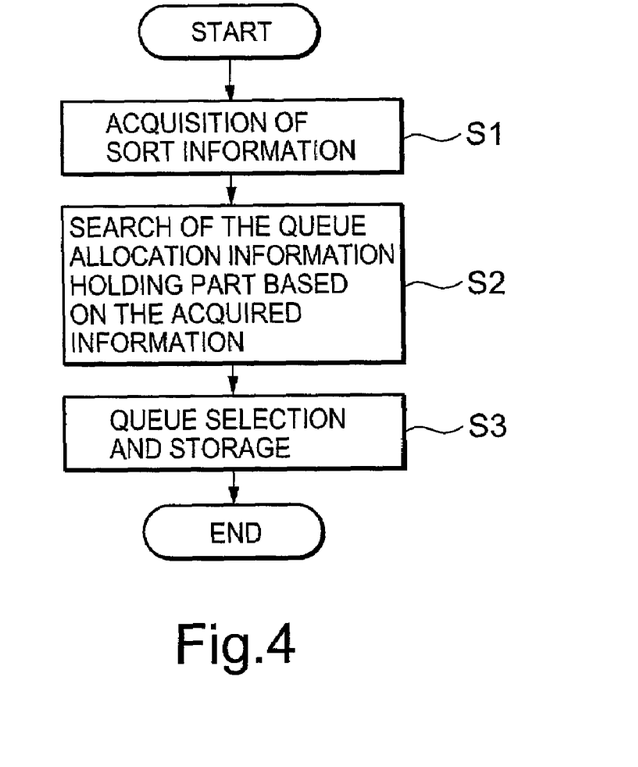
FIG. 4 is a flowchart showing a process operation example of a queue sort selection part of FIG. 1.

In a packet inputted to the queue sort selection part 1, a portion having a specified position and a specified size is extracted as information of the sort tag 13 (S1). The extracted sort tag 13 information is used as a key to search all entries of the sort tag contents 22 of the queue allocation information holding part 3 so as to specify the corresponding line of the queue allocation information holding part 3 in a search process (S2). Finally, the queue sort selection part 1 selects one queue having a queue ID included in the queue ID 23 of a specified line from N pieces of queues A5 to Z6 so as to add the packet to the queue (S3).

The N pieces of queues A5 to Z6 realized in the holding storage part 4 are a FIFO type queue, and the packet is transmitted in the order in which it is stored into the queue.

The utilization computation part 7 computes utilization of each queue by computing the packet storage number of the each queue. The packet storage number may be regularly computed at certain time intervals. Alternatively, the packet storage number may be irregularly computed by a command from a service person in charge of a packet exchanger.

Figure 5:
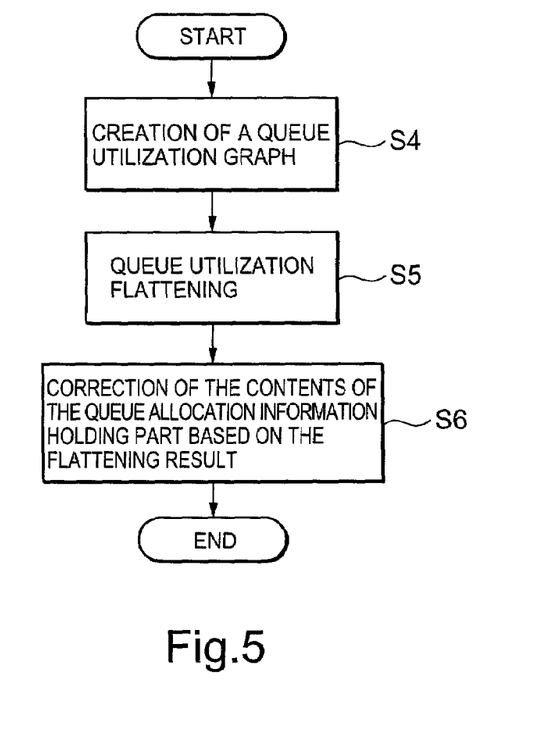
FIG. 5 is a flowchart showing a process operation example of an allocation coordinating part of FIG. 1.
Figure 6:
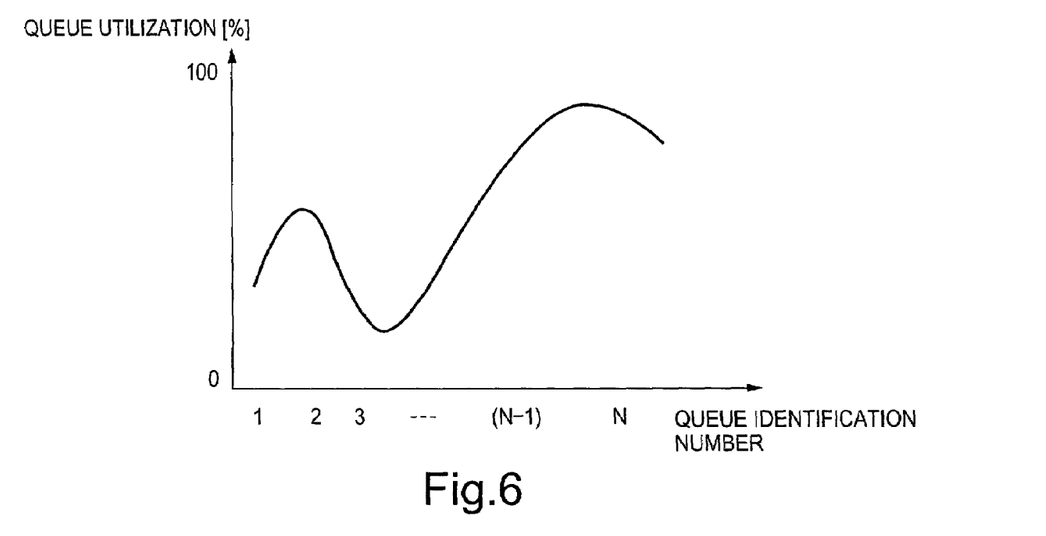
FIG. 6 is a graph showing queue utilization before a flattening process.
Figure 7:
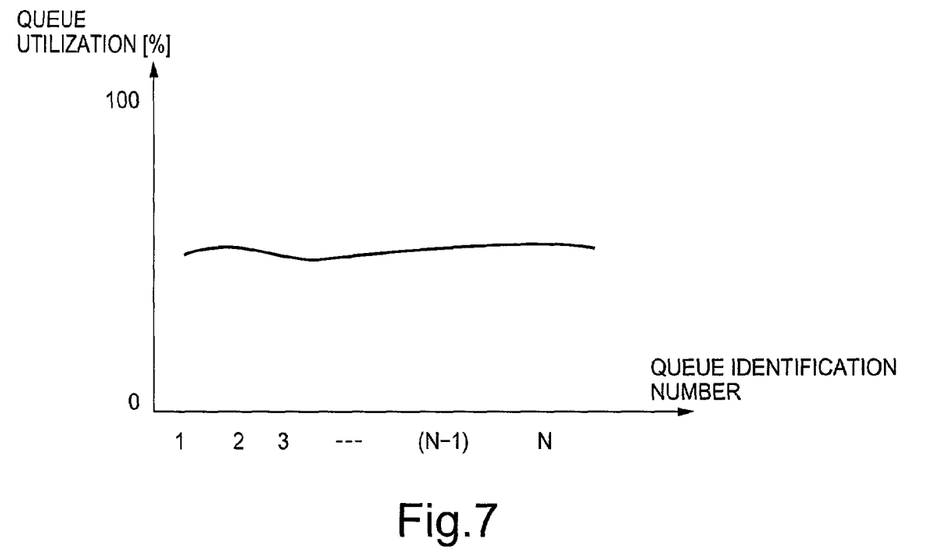
FIG. 7 is a graph showing queue utilization after a flattening process.

The operation of the allocation coordinating part 8 will be described using a flowchart shown in FIG. 5. The allocation coordinating part 8 creates from information of the queue utilization computed by the utilization computation part 7 a graph in which the identification number of a queue is indicated by the X axis and utilization of the queue is indicated by the Y axis (S4). The queue utilization flattening process is performed to all queues having a queue identification number described in the X axis (S5). A new allocating result is computed in order to divide and allocate the inputted packets among all queues.

In the above flattening process, the number of sort tags to be allocated to a queue having high utilization is decreased and the number of sort tags to be allocated to a queue having low utilization is increased. This performs sort tag and queue reallocation so that utilizations of the queues are almost equal. For example, the state of utilizations of the queues shown in FIG. 6 can be changed to the utilization state shown in FIG. 7 by performing the flattening process.

Finally, based on the allocating result, the contents of the related entry of the queue allocation information holding part 3 requiring correction are corrected (S6). The operation of the allocation coordinating part 8 is processed in a predetermined cycle.

The present invention is applied to a queue allocation system of a packet exchanger having a data packet network using a priority control mechanism such as Differentiated Services (Diffserv), IP Precedence, and IEEE 802.1D Traffic Prioritization. In this system, when the queue allocating results of the inputted packets are concentrated onto one queue, utilization information of each of the queues is fed back to perform queue reallocation. This divides the inputted packets among a plurality of queues so as to prevent transmission quality deterioration due to packet concentration onto one queue, and realize enhancement of the resource utilization of all queues and finer priority control.

Figure 8:
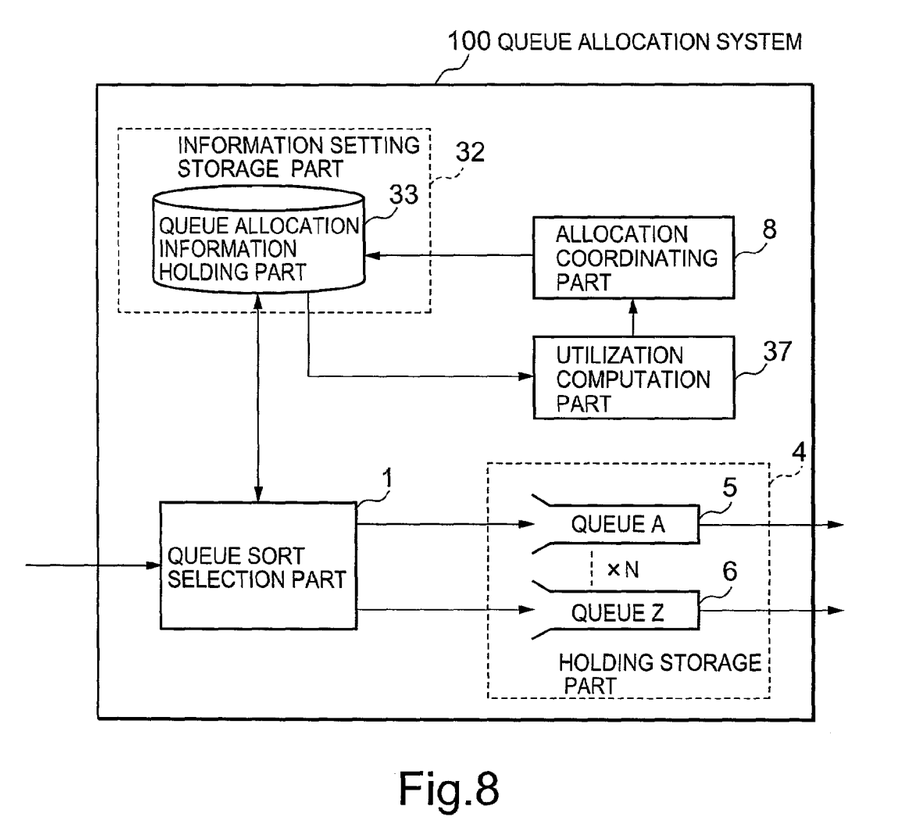
FIG. 8 is a block diagram showing the configuration of a queue allocation system according to a second embodiment of the present invention.
Figure 9:
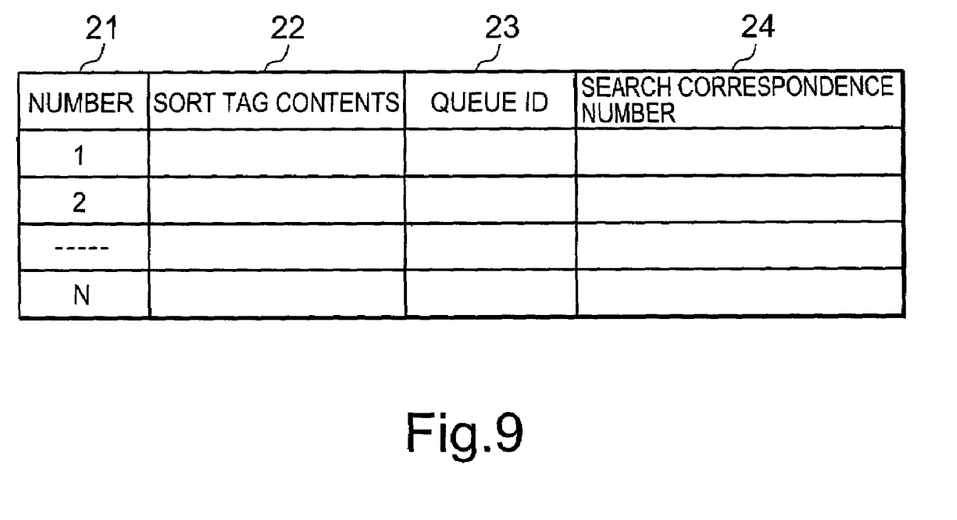
FIG. 9 is a diagram showing the structure of stored data in a queue allocation information holding part of FIG. 8.

A second embodiment according to the present invention will be described. FIG. 8 is a block diagram showing the configuration of a queue allocation system 100 of a packet exchanger according to the second embodiment. FIG. 9 shows the structure of stored data in a queue allocation information holding part 33 of FIG. 8.

A difference between the second embodiment and the first embodiment is that the allocation coordinating part 8 employs the search correspondence number of the sort tag in the queue allocation information holding part as queue utilization information used for the flattening process. In other words, in the second embodiment shown in FIG. 8, the queue allocation information holding part 3 of the information setting storage part 2 of FIG. 1 is replaced with the queue allocation information holding part 33. The stored data structure in the queue allocation information holding part 33 shown in FIG. 9 adds the search correspondence number 24 to the stored data structure in the queue allocation information holding part 3 shown in FIG. 3.

Feedback information inputted to a utilization computation part 37 is changed so as to be obtained from the queue allocation information holding part 33, not from the holding storage part 4 in FIG. 1.

With the above change, the search correspondence number 24 for each of the sort tags is provided in the queue allocation information holding part 33 of FIG. 8. Utilization of a certain specified entry can be computed by the utilization computation part 37. The allocation coordinating part 8 obtains from information in the utilization computation part 37 a graph in which the numeral 21 related to the sort tag 13 of each packet is indicated by the X axis and the search correspondence number 24 of the sort tag 13 is indicated by the Y axis to perform a flattening process of the search correspondence number targeting all ranges of the X axis. This provides a mechanism to divide and allocate the inputted packets among all queues to compute a new allocating result.

In the flattening process of the search correspondence number of this embodiment, a portion having a high utilization frequency of a certain specified entry (the high number of the search correspondence number) decreases the number of the sort tags allocated to one queue and a portion having a low utilization frequency thereof (the low number of the search correspondence number) increases the number of the sort tags allocated to one queue. Sort tag and queue reallocation is performed so that utilization frequencies of the entries are almost equal. Other structures and operations are similar to the first embodiment.

In such a manner, in the second embodiment, based on utilization frequency information of each of the sort tags, optimal sort tag and queue allocation is computed to divide and allocate the packets concentrated onto one queue among all queues. The same effect as described in the first embodiment can be obtained.

Figure 10:
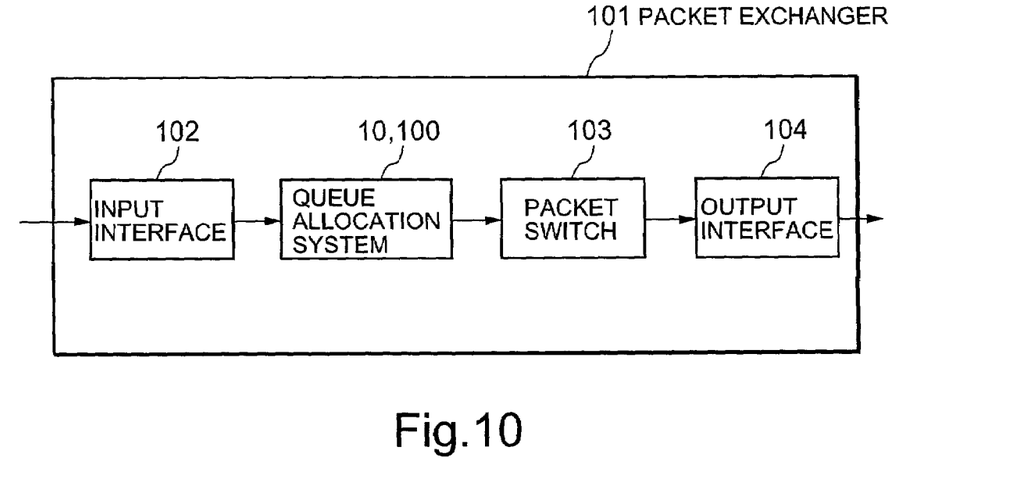
FIG. 10 is a block diagram showing the configuration of a packet exchanger according to a third embodiment of the present invention.

A third embodiment according to the present invention will be described. FIG. 10 is a block diagram showing the configuration of a packet exchanger according to the third embodiment. As shown in this drawing, the queue allocation system of the first or second embodiment of the present invention, a packet switch, an input interface and an output interface are provided to realize a packet exchanger. This packet exchanger divides inputted packets among a plurality of queues. Transmission quality deterioration due to packet concentration onto one packet can be prevented and enhancement of the resource utilization of all queues and finer priority control can be realized.

Figure 11:
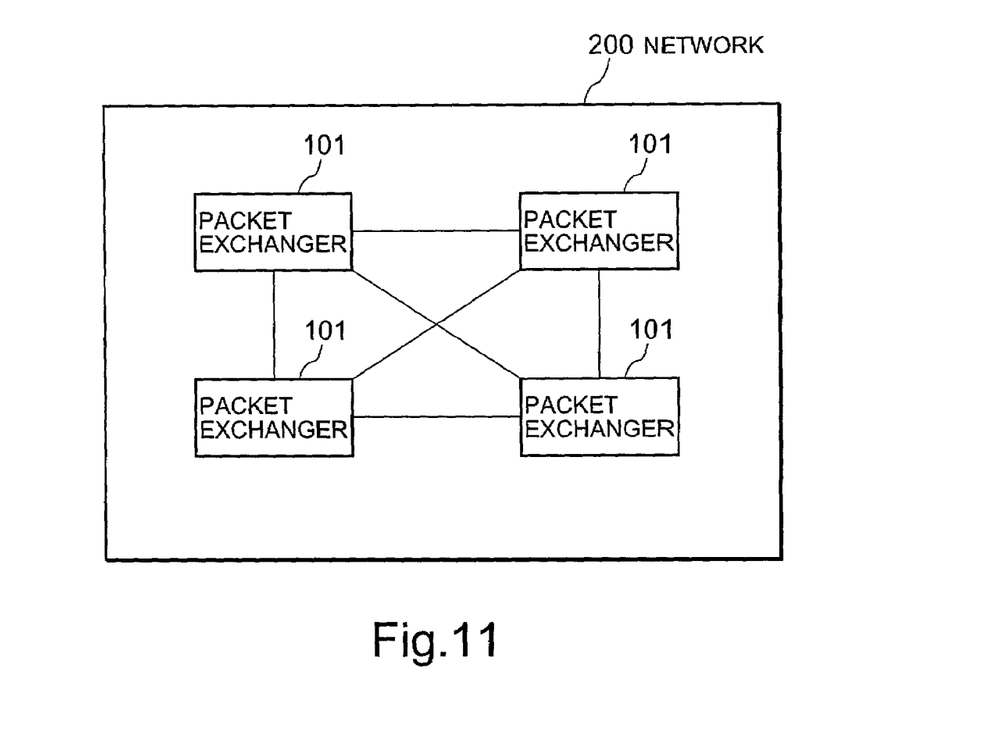
FIG. 11 is a block diagram showing the configuration of a network according to a fourth embodiment of the present invention.

A fourth embodiment according to the present invention will be described. FIG. 11 is a block diagram showing the configuration of a network according to the fourth embodiment. As shown in this drawing, a plurality of the packet exchangers according to the third embodiment of the present invention are interconnected to realize this network. This network divides the packets inputted to the plurality of packet exchangers among a plurality of queues. Transmission quality deterioration due to packet concentration onto one queue can be prevented and enhancement of the resource utilization of all queues and finer priority control can be realized.

The above embodiments are preferable embodiments according to the present invention. The present invention is not limited to this, and various modifications can be made within the range not deviating from the purpose of the present invention.

According to the present invention, the following effects can be obtained. First, a flattening method of queue utilizations is used to perform feedback control to divide and allocate inputted packets among all queues. For this reason, even when packet storage is concentrated onto one queue due to packets having a similar priority, deterioration of transmission quality such as a delay characteristic, packet loss percentage and a jitter characteristic due to packet concentration onto one queue can be prevented.

Second, packets concentrated onto one queue are divided and allocated among all queues to compute new allocation. Enhancement of the resource average utilization of all queues can be realized.

Third, a mechanism to divide and allocate packets concentrated onto one queue among queues having different transmission priority orders is provided. When only different kinds of packets having a similar priority are consecutive, finer priority control adapted to occasional packet priority conditions can be realized so as to allocate these different packets to different queues.

While this invention has been described in connection with certain preferred embodiments, it is to be understood that the subject matter encompassed by way of this invention is not limited to those specific embodiments. On the contrary, it is intended for the subject matter of the invention to include all alternative, modification and equivalents as can be included within the spirit and scope of the following claims.

What is claimed is:

1. A queue allocation system which divides and allocates packets concentratively stored into a specified queue among queues other than said specified queue, comprising:
   a utilization computation part for computing utilization of each queue by computing the number of packets stored in said each queue;
   an allocation coordinating part for computing a new allocating result in order to divide and allocate inputted packets among all queues using information of said utilization computation part;
   a queue sort selection part for using as a search key a sort tag included in said packet inputted to said queue allocation system to decide a queue to be allocated to the packet;
   information setting storage part for holding information for allowing said queue sort selection part to decide a queue to be allocated to said inputted packet; and
   holding storage part for holding more than one piece of said queue in which packet allocation is decided by said queue sort selection part, wherein said packet is transmitted in the order in which it is stored into the queue held in said holding storage part.

2. The queue allocation system according to claim 1, wherein said utilization computation part uses said allocation information outputted from said holding storage part to compute said utilization.

3. The queue allocation system according to claim 1, wherein said queue sort selection part determines a queue to be allocated to said packet in said more than one piece of said queue realized in said holding storage part to add said packet to the queue.

4. The queue allocation system according to claim 1, wherein said information setting storage part has a queue allocation information holding part for holding queue allocation information realized in the information setting storage part.

5. A queue allocation system which divides and allocates packets concentratively stored into a specified queue among queues other than said specified queue, comprising:
- a queue sort selection part for using as a search key a sort tag included in said packet inputted to said queue allocation system to decide a queue to be allocated to the packet;
- an information setting storage part for holding information for allowing said queue sort selection part to decide a queue to be allocated to said inputted packet;
- a utilization computation part for computing utilization of each queue;
- a holding storage part for holding more than one piece of said queue in which packet allocation is decided by said queue sort selection part, wherein said packet is transmitted in the order in which it is stored into the queue held in said holding storage part, and wherein said utilization computation part uses information of the search correspondence number of said sort tag outputted from said information setting storage part to compute said utilization.

6. A queue allocation method of a packet exchanger which divides and allocates packets concentratively stored into a specified queue among queues other than said specified queue, comprising:
- a utilization computation step for computing utilization of each queue by computing the packet storage number of packets in said each queue;
- an allocation coordinating step for computing a new allocating result in order to divide and allocate inputted packets among all queues using information of said utilization computation step;
- a queue sort selection step for using as a search key a sort tag included in said packet inputted to said packet exchanger to decide a queue to be allocated to the packet;
- an information setting storage step for holding information for allowing said queue sort selection step to decide a queue to be allocated to said inputted packet; and
- a holding storage step for holding more than one piece of said queue in which packet allocation is decided by said queue sort selection step,
- wherein said packet is transmitted in the order in which it is stored into the queue held in said holding storage step.

7. The queue allocation method according to claim 6, wherein said utilization computation step uses said allocation information outputted from said holding storage step to compute said utilization.

8. The queue allocation method of a packet exchanger according to claim 6, wherein said queue sort selection step determines a queue to be allocated to said packet in said more than one piece of said queue realized in said holding storage step to add said packet to the queue.

9. The queue allocation method of a packet exchanger according to claim 6, wherein said information setting storage step has a queue allocation information holding step for holding queue allocation information realized in the information setting storage step.

* * * * *